US005281275A

United States Patent [19]

Milner

[11] Patent Number: 5,281,275

[45] Date of Patent: Jan. 25, 1994

[54] APPARATUS AND METHOD FOR ENHANCING SUGAR CRYSTAL/MOLASSES SEPARATION EFFICIENCY IN A SUGAR CENTRIFUGAL

[75] Inventor: Ted D. Milner, Westminster, Colo.

[73] Assignee: Silver Engineering Works, Inc., Aurora, Colo.

[21] Appl. No.: 806,521

[22] Filed: Dec. 13, 1991

[51] Int. Cl.[5] ......................... C13F 1/06; B01D 35/00; B04B 15/08

[52] U.S. Cl. ......................................... 127/2; 127/17; 127/19; 127/56; 210/394; 210/406; 210/781; 494/61

[58] Field of Search ......................... 127/17, 19, 56, 2; 210/781, 787, 360.1, 406, 369; 494/61

[56] References Cited

U.S. PATENT DOCUMENTS

| | | | |
|---|---|---|---|
| 3,050,190 | 8/1962 | Siepe | 210/380.1 |
| 3,403,785 | 10/1968 | Mercier | 210/369 |
| 4,033,879 | 7/1977 | Natt et al. | 127/56 |

*Primary Examiner*—R. Bruce Breneman
*Assistant Examiner*—Patricia Hailey
*Attorney, Agent, or Firm*—Robert F. Palermo

[57] ABSTRACT

A sugar centrifugal operates at decreased speed to reduce crystal damage but suffers no loss of sugar crystal/molasses separation rate. This is accomplished by superposing a partial vacuum on the molasses chamber of the centrifugal which promotes removal of syrup and water from the sugar crystals through the centrifugal basket wall. Additional drying of the separated crystals is provided by injection of air above the sugar chamber to replace that which is extracted through the centrifugal basket wall.

4 Claims, 2 Drawing Sheets

APPARATUS AND METHOD FOR ENHANCING SUGAR CRYSTAL/MOLASSES SEPARATION EFFICIENCY IN A SUGAR CENTRIFUGAL

BACKGROUND OF THE INVENTION

This invention relates generally to sugar making machinery and more particularly to devices and methods for achieving improvements in sugar centrifugals which provide enhanced molasses/sugar crystal separation efficiency.

Sugar making requires several operations for separating massecuite into sugar crystals and molasses (or runoff), its two components. In all cases except for separation of high grade sugar crystals, the crystals are remelted and further refined. The quality and integrity of the crystals after separation is therefore of minimal consequence except in the case of high grade sugar.

Broken crystals require downgrading of sugar product, and they must, therefore, be avoided. However, the viscosity of the molasses component of the massecuite requires centrifugal separation in order to free the sugar crystals of the surrounding syrup. The high discharge velocity and resultant high gravity forces imposed on the massecuite by the centrifugals frequently results in excessive damage to the sugar crystals.

Reducing centrifugal operating speed will reduce crystal impact damage, but it also reduces production and it leaves more water and syrup on the crystals which results in lump and cake formation during storage. This is a very undesirable trade-off but is an expected draw-back of the high viscosity of the molasses. Excessive water addition for rinsing sugar crystals and diluting the molasses results in waste of water and in increased energy consumption for subsequent evaporation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus and method for enhancing centrifugal separation of sugar crystals from molasses including a fan means for extracting air from a molasses tank and for directing said air into the top of the sugar centrifugal housing.

The foregoing and other aspects will become apparent from the following detailed description of the invention when considered in conjunction with the accompanying drawing figures.

BRIEF DESCRIPTION OF THE DRAWING FIGURES

FIG. 1 is a schematic elevation view illustrating an embodiment of a molasses/crystal separation enhancement apparatus for a sugar centrifugal; and FIG. 2 is an elevation sectional view of a portion of a sugar centrifugal incorporating the present invention.

DETAILED DESCRIPTION

Figure 1:
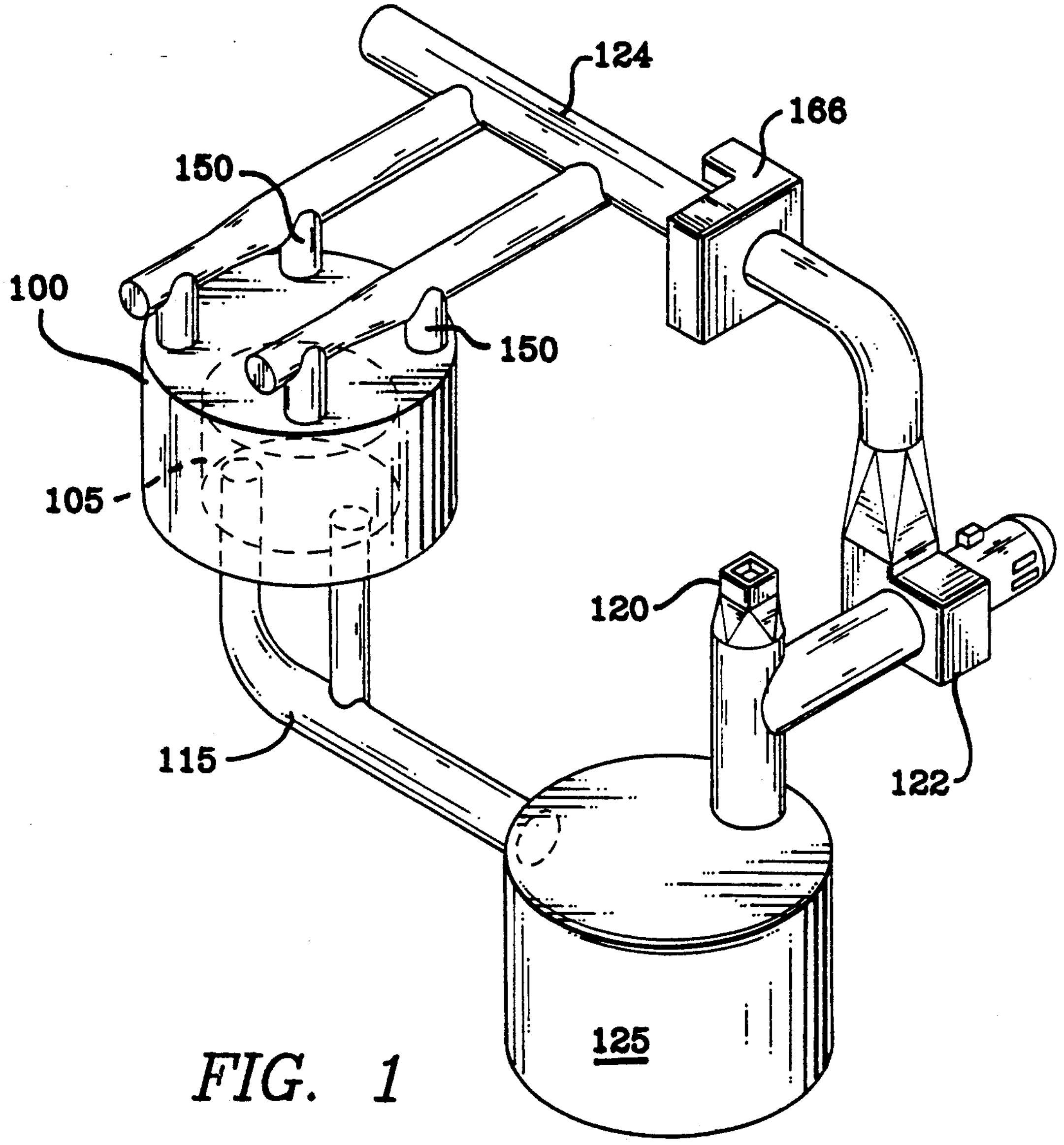
Figure 2:
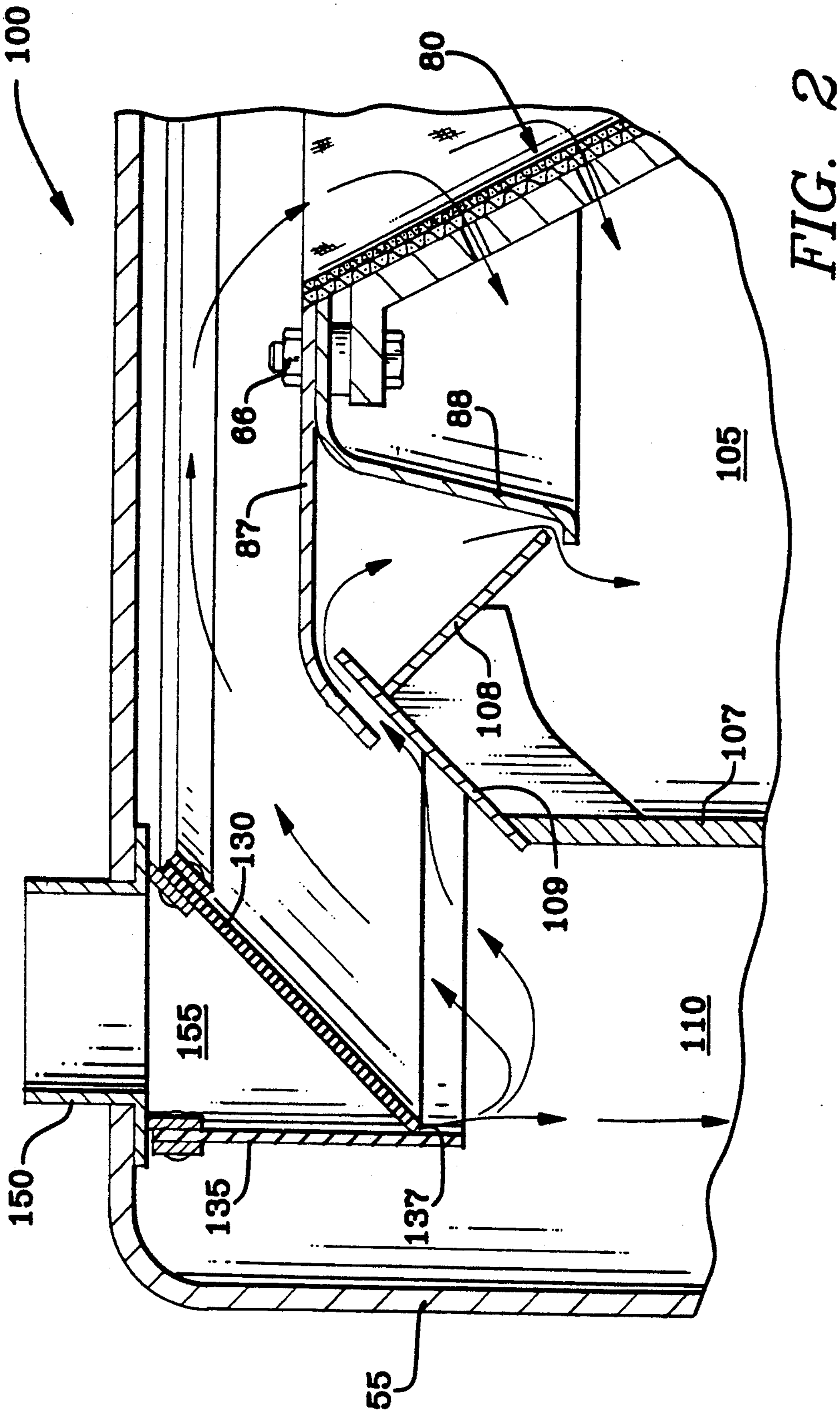

The processing system shown in FIGS. 1 and 2 is composed of sugar centrifugal 100 in which sugar crystals and molasses are separated. The molasses drains through rotating centrifugal basket 80 into molasses chamber 105, while sugar crystals travel upward in the basket and are discharged across upper shroud ring 87 from which they are slung outwardly. The sugar crystals strike shock absorbing barrier inner member 130 and are deflected downward into sugar chamber 110 which surrounds and is separated from molasses chamber 105 by chamber wall 107.

The shock absorbing barrier is made up of inner member 130, which is a truncated hollow conic member formed from a resilient elastomeric or polymeric material, and of a surrounding outer member 135, a substantially cylindrical member made of the same material. These two resilient members, together with the sugar housing top, form an annular plenum 155 having a triangular cross section and including the mouth of ventilator pipe(s) 150. The barrier thus formed intercepts sugar crystals slung from upper shroud ring 87 to prevent their impacting against sugar housing 55 and to absorb most of their kinetic energy before they fall to sugar chamber 110.

Outer member 135, in addition to providing a secondary deflection surface for crystals caroming off inner member 130, makes a line 137 of firm contact against the edge of inner member 130. This contact line resists passage of air outward from plenum 155 and causes pulsation of any outflowing air and consequently, vibration or fluttering of members 130 and 135.

At the top of chamber wall 107 are sugar seal 109 and molasses seal 108 which cooperate with upper shroud ring 87 and lower shroud ring 88, respectively, which are fastened to basket 80 by fasteners 66, to form a labyrinth seal between sugar chamber 110 and molasses chamber 105. This seal presents a sufficient impediment to air flow to support a slight pressure gradient from sugar chamber 110 to molasses chamber 105.

Air circulation in the system is provided by air pump 122 which may be a fan or blower whose intake connects to the top of molasses tank 125 and extracts air from the tank. This creates a partial vacuum in molasses tank 125 while pressurizing air supply duct 124. Vacuum control damper 120 regulates the strength of the vacuum in molasses tank 125. Air supply duct 124 supplies ventilation pipe(s) 150 with pressurized air which is distributed through plenum 155 and flows through contact line 137 to vibrate inner member 130 and outer member 135.

The partial vacuum in molasses tank 125 transfers through molasses drain pipe 115 to molasses chamber 105 where it lowers the pressure. This causes an air influx tendency through the wall of centrifugal basket 80 and through the labyrinth seal at the top of chamber wall 107. The labyrinth seal permits only a low volume air flow into molasses chamber 105; therefore, the bulk of the air flow is through basket 80. This increases the extraction rate of molasses from the massecuite in the basket and permits operation of the centrifugal at a lower speed without sacrificing the production rate and without undue dilution of the molasses.

Starting from air pump 122, a vacuum, the strength of which is determined by vacuum control damper 120, is created in molasses tank 125. This vacuum imposes a suction on molasses chamber 105 through molasses drain pipe 115. This suction transfers through the wall of basket 80 and acts together with the centrifugal forces within the basket to increase the flow of molasses into molasses chamber 105. At the same time, the air being introduced from supply duct 124 through ventilation pipe 150 pressurizes plenum 155 and is released through contact line 137 between inner member 130 and outer member 135 to create the desired vibration of those members and to replenish the air supply within basket 80 that is being drawn with the molasses and rinse water through the basket wall into molasses chamber 105.

In FIG. 2, proportionally sized arrows are used to approximate the division of the air being introduced through contact line 37. Roughly half the air travels straight downward in sugar chamber 110, absorbs moisture suspended in the chamber, and is removed with the sugar crystals. About one-tenth flows through the labyrinth seal at the top of chamber wall 107 directly into molasses chamber 105, and approximately four-tenths of the air flows into basket 80 and thence through the basket wall into the molasses chamber. These proportions are changeable depending upon the strength of the vacuum, the amount of open area in the screens of basket 80, the air flow rate, the temperature, the humidity, and the type of product. Incorporation of an optional air dryer 166 into supply duct 124 permits adjustment of the degree of moisture removal accomplished in sugar chamber 110.

What is claimed is:

1. An apparatus for enhancing centrifugal separation of sugar crystals from molasses, comprising:

fan means for extracting air from a molasses tank, for thereby creating a reduced pressure condition in a molasses chamber surrounding a centrifugal basket, and for directing said extracted air into the top of a sugar centrifugal housing in which said centrifugal basket and said molasses chamber are located.

2. The apparatus of claim 1, further comprising:

a vacuum control damper means for adjusting the magnitude of the reduced pressure condition in the molasses chamber.

3. The apparatus of claim 1, further comprising:

an air dryer means in an air supply duct for increasing the moisture absorption capacity of air passing through the duct into the centrifugal housing.

4. A method for enhancing separation efficiency of a sugar centrifugal, including the steps of:

extracting air from a molasses chamber surrounding a centrifugal basket in which sugar crystals and molasses are screened for separation; and directing said air into the top of a housing of said sugar centrifugal, in which said centrifugal basket and said molasses chamber are located, above a screen wall of said centrifugal basket.

* * * * *